United States Patent [19]

Bronson

[11] Patent Number: 4,580,793
[45] Date of Patent: Apr. 8, 1986

[54] SPLIT ROTARY SEAL RING AND METHOD FOR MAKING SAME

[75] Inventor: Henry D. Bronson, Oak Brook, Ill.

[73] Assignee: Bronson & Bratton, Hinsdale, Ill.

[21] Appl. No.: 634,688

[22] Filed: Jul. 26, 1984

[51] Int. Cl.4 ............................................. F16J 15/24
[52] U.S. Cl. .................................. 277/199; 29/156.62
[58] Field of Search ............................. 277/199, 198; 29/156.62, 156.6

[56] References Cited

U.S. PATENT DOCUMENTS

| 639,722 | 12/1899 | France . | |
|---------|---------|----------|---|
| 865,998 | 9/1907 | Cook . | |
| 1,084,281 | 1/1914 | King . | |
| 1,366,219 | 1/1921 | Sudekum . | |
| 1,986,465 | 1/1935 | Dempsey | 277/199 |
| 2,459,370 | 1/1949 | Ferguson et al. . | |
| 3,231,289 | 1/1966 | Carrell | 277/196 |

Primary Examiner—Robert I. Smith
Attorney, Agent, or Firm—Willian Brinks Olds Hofer Gilson & Lione Ltd.

[57] ABSTRACT

A split rotary seal ring is cut from an integral workpiece by forming a kerf which is inclined at a constant angle with respect to axial faces of the workpiece, thereby cutting the workpiece into two mating seal ring segments. The kerf is shaped to provide a 360° radial interlock between the two seal ring segments. The two segments are then moved axially with respect to one another to close the kerf, and one or both of the axial faces are then finished to provide the seal faces of the seal ring. This geometry and method result in a seal ring in which neither the inner nor outer cylindrical surfaces must be refinished after the original one piece workpiece has been split into the two seal ring segments.

24 Claims, 8 Drawing Figures

SPLIT ROTARY SEAL RING AND METHOD FOR MAKING SAME

BACKGROUND OF THE INVENTION

The present invention relates to an improved split rotary seal ring and to a method for making such a seal ring.

Fluids such as water, sewage, oil and a wide variety of organic and inorganic chemicals are typically pumped by sealed pumps under pressure for transport. Most high volume pumps in use today include a rotary drive shaft which passes into a pump housing and is dynamically sealed with respect to the housing by means of a rotary seal. Such a rotary seal is commonly provided by a highly polished, flat, annular surface of a seal seat, which is aligned with a flat, spring or hydraulically loaded mating seal ring. The seal ring defines a flat seal surface positioned to rotate against the annular surface of the seal seat.

Such seal surfaces are subject to wear, and seal rings are typically replaced periodically to avoid leaking. In the case of integral, one piece seal rings, replacement is typically accomplished by disconnecting a coupling between the pump and the rotating power source, removing the worn seal ring, and replacing it with a new seal ring. The new seal ring is positioned over the pump shaft by passing it through a gap between the motor shaft and the pump shaft where the pump coupling was removed or separated.

Occasionally however, the coupling between the pump and motor shafts is difficult to disconnect or it does not exist. In these cases, a one piece, integral seal ring cannot be replaced without disassembly of the pump or the motor, which may not be practical. Under these conditions, the seal ring must be split so that each half can be placed around the pump shaft and then reassembled to form the flat annular sealing surface.

SUMMARY OF THE INVENTION

The present invention is directed to an improved split rotary seal ring having an improved geometry for the split surfaces, which provides a strong assembly which can readily be disassembled and reassembled with the required accuracy.

According to one aspect of this invention, a rotary seal ring is provided which comprises first and second seal ring segments, each of which defines a respective first and second end. The first ends are shaped to interlock with one another and the second ends are shaped to interlock with one another such that the seal ring segments are mobilized against relative movement in any radial direction when the ends of the seal ring segments are interlocked to form an assembled seal ring. The assembled seal ring defines at least one axial face, and the first and second ends of the first seal ring segment define respective slant faces extending completely across the seal ring segment and inclined toward the axial face. The first and second ends of the second seal ring segment define respective slant faces extending completely across the second seal ring segment and inclined away from the axial face. The slant faces defined by the first seal ring segment are shaped to mate with respective ones of the slant faces defined by the ends of the second seal ring segment.

In addition, this invention is directed to an improved method for forming a split rotary seal ring from an integral workpiece which has at least one surface of revolution finished to final size and roundness, such that no refinishing or reshaping of this surface is required after the workpiece has been split.

According to this aspect of the invention, a method for forming a split seal ring comprises the steps of (1) providing an integral, annular workpiece having a surface of revolution centered on an axis, (2) cutting the workpiece to form a kerf at two regions in the workpiece in order to create two separate ring segments, said kerf being oriented at a substantially constant, non-zero angle with respect to a plane transverse to the axis and shaped such that the two ring segments are radially interlocked and axially interlocked in one direction only, (3) moving one of the ring segments axially with respect to the other to close the kerf; and then (4) finishing an axial seal surface on the first and second ring segments.

This method for forming a split seal ring provides the important advantage that the surface of revolution can be finished to final size prior to cutting the workpiece to form the two separate ring segments. Because the kerf is closed by axial movement of the ring segments, the shape and size of the surface of revolution are not disturbed. Preferably, the geometry of the split seal ring formed with the method of this invention is that described above.

The invention itself, together with further objects and attendant advantages, will best be understood by reference to the following detailed description taken in conjunction with the accompanying drawings.

DETAILED DESCRIPTION OF THE PRESENTLY PREFERRED EMBODIMENTS

Figure 1:
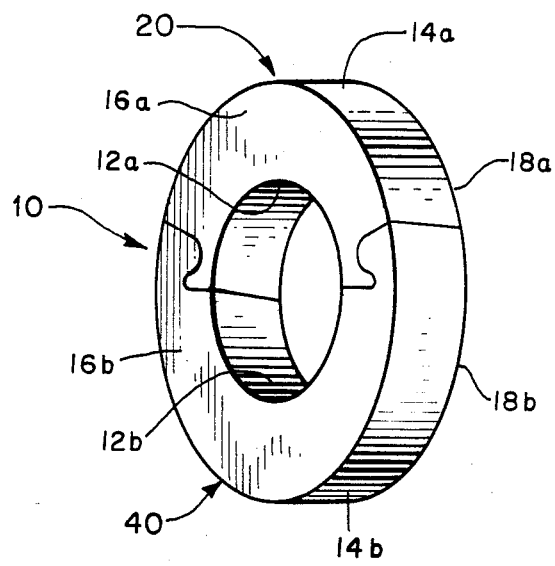
FIG. 1 is a perspective view of a presently preferred embodiment of the split seal ring of this invention.

Turning now to the drawings, FIG. 1 shows a perspective view of a rotary seal ring 10 which incorporates the presently preferred embodiment of this invention. This seal ring 10 defines an inner cylindrical surface 12a, 12b and a concentric outer cylindrical surface 14a, 14b. In addition, the seal ring 10 defines spaced, parallel, planar, axial surfaces 16a, 16b, 18a, 18b which define the sealing surfaces of the seal ring 10.

Figure 2:
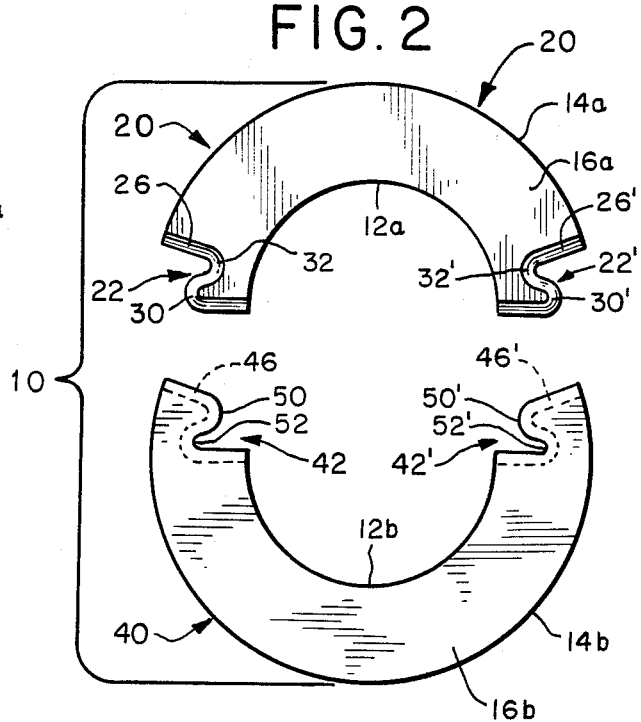
FIG. 2 is a top view of the split seal ring of FIG. 1 showing the two seal ring segments separated from one another.

The seal ring 10 is made up of two component parts: a first seal ring segment 20 and a second seal ring segment 40. The first seal ring segment 20 defines two ends 22, 22', as best shown in FIG. 2. Each of the ends 22, 22' is defined by a respective slant face 26, 26'. Each of the slant faces 26, 26' can be thought of as a folded plane which defines a meander pattern such as an S curve, and which defines a diverging ridge 30, 30' as well as a converging trough 32, 32', respectively. The diverging ridges 30, 30' diverge or increase in width with increased distance from the axial face 16a. Conversely, the converging troughs 32, 32' converge or decrease in width with increasing distance from the axial face 16a.

The second seal ring segment 40 defines two ends 42, 42', each of which defines a respective slant face 46, 46'. The slant faces 46, 46' define converging ridges 50, 50' and diverging troughs 52, 52', respectively. The converging ridges 50, 50' converge or decrease in width with increasing distance from the axial face 16b. Conversely, the diverging troughs 52, 52' diverge or increase in width with increasing distance from the axial face 16b.

The ends 42, 42' are shaped to interlock with the ends 22, 22', respectively, in order to hold the two seal ring segments 20, 40 securely in alignment. The converging ridges 50, 50' act as wedges shaped to mate with respective ones of the converging troughs 32, 32', and the diverging ridges 30, 30' are shaped to mate with the diverging troughs 52, 52'.

Of course, it should be understood that the illustrated embodiment is only one of many possible geometries which embody the basic concept of this invention. In this embodiment, the slant faces 26, 26' are oriented at a constant angle of about 97° with respect to the axial face 16a. In this embodiment, the slant faces 46, 46' are inclined at a constant supplementary angle of about 83° with respect to the axial face 16b. Because the slant faces 26, 26', 46, 46' are inclined in this manner, the seal ring segments 20, 40 are locked against axial movement in one direction but are free to separate from one another in the other axial direction. The S curve shape of the slant faces 26, 26', 46, 46' insures that the first seal ring segment 20 is locked against radial movement in any radial direction with respect to the second seal ring segment 40 when the two segments 20, 40 are assembled as shown in FIG. 1.

Figure 6:
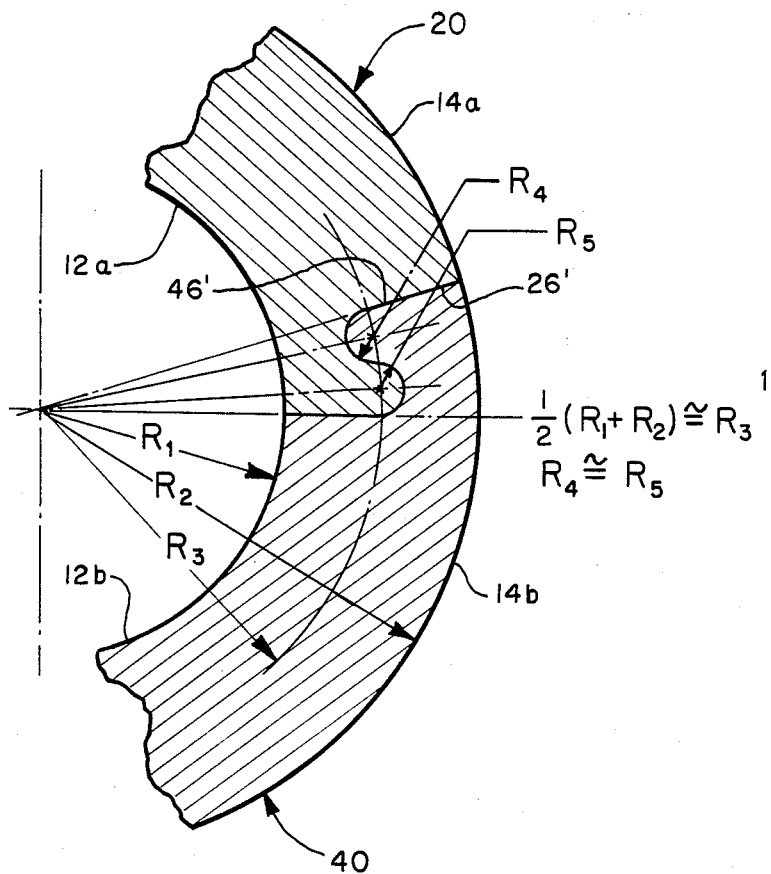
FIG. 6 is a partial sectional view taken along line 6—6 of FIG. 5.
Figure 7:
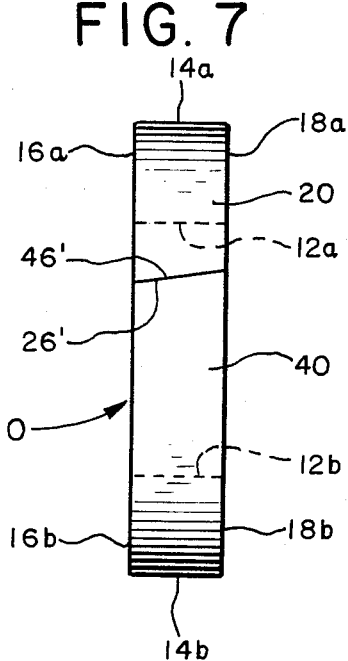
FIG. 7 is a view corresponding to FIG. 5 showing the finished seal ring after the axial seal faces have been finished.

FIG. 6 shows a cross-sectional view which illustrates clearly the geometry of the ends 22, 22', 42, 42' of this embodiment. In this embodiment, the radius of curvature $R_4$ is approximately equal to the radius of curvature $R_5$ at the axial center of the seal ring 10, and the radius $R_3$ is approximately equal to the average of the radii $R_1$, $R_2$.

A wide variety of materials may be used to form the seal ring 10. Cemented tungsten carbide, silicon carbide, and various ceramic materials are several examples. By way of illustration only, cemented tungsten carbide with 6% cobalt binder has been used successfully with this invention.

Figure 3:
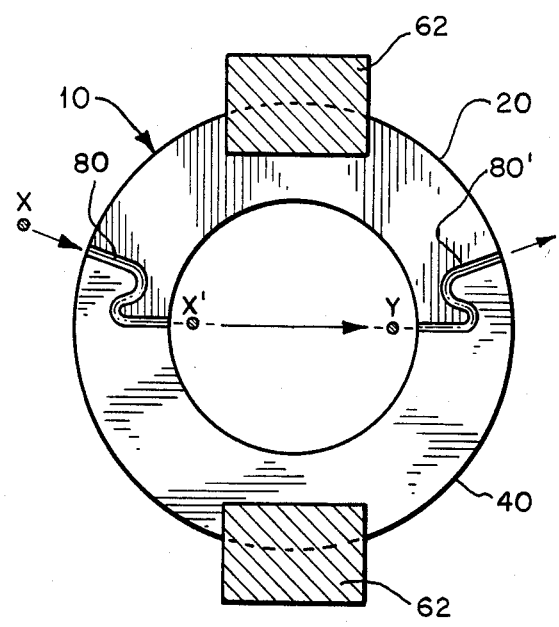
FIG. 3 is a top view of the seal ring of FIG. 1 in a first stage of fabrication, after the solid workpiece has been cut into two segments but before the axial surface has been finished.

FIGS. 3–5 and 7 illustrate the steps of the presently preferred method which can be used to form the seal ring 10 of FIG. 1. The first step as shown in FIG. 3 is to clamp an integral one piece seal ring workpiece by means of clamps 62. This one piece workpiece has inner and outer cylindrical surfaces which are finished with regard to roundness and finish. The one piece workpiece is then cut to form the two segments 20, 40 by cutting a thin section out of the integral workpiece using a wire as a cutting tool. This wire is moved axially in a manner similar to the motion of a bandsaw blade. If the work piece is not conductive, an abrasive is used between the wire and the workpiece to produce the cutting action. If the workpiece is conductive, the electrical discharge machining method may be used to produce the cutting action. This machining technique is commonly known as the traveling wire electrical discharge machining method. In this embodiment, the wire is used to form a kerf 80, 80' having a width of about 0.010 inches. First the wire is moved from point x to point x' to form the kerf 80, and then the wire is moved from point y to point y' to form the kerf 80'. These kerfs 80, 80' are inclined as described above in conjunction with FIG. 2.

Generally, if the kerfs 80, 80' are too close to 90°, excessive stock removal is required in the face grinding step described below. If the kerfs 80, 80' are too far from 90°, machining problems may be encountered and the axial lock will not be as effective. The 97° kerf angle described above has been chosen as a compromise between these factors. Other kerf angles will be suitable in other embodiments.

Figure 8:
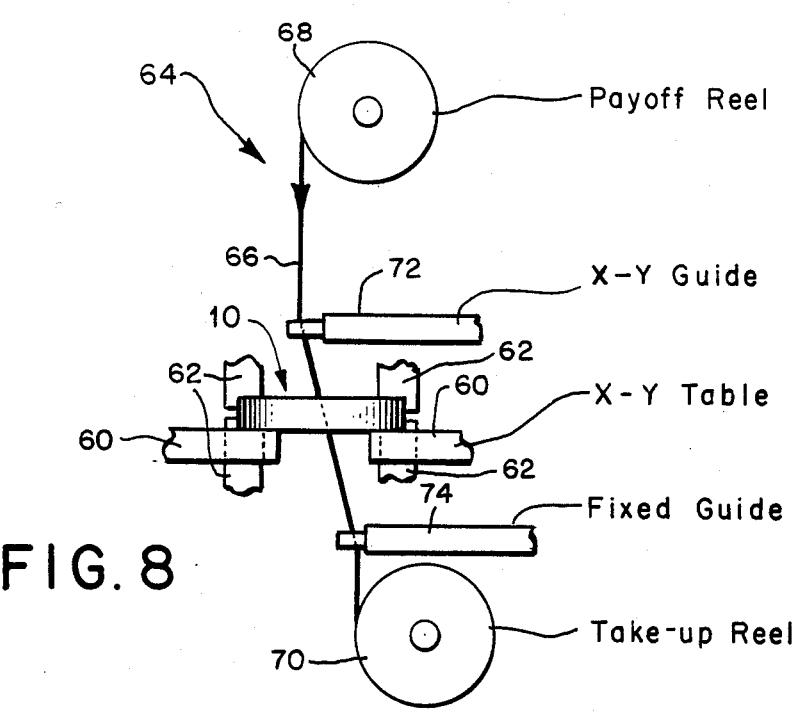
FIG. 8 is a schematic representation of a device suitable for use in forming the interlocked ends of the seal ring of FIG. 1.

FIG. 8 shows a schematic representation of an arrangement that can be used to form the kerfs 80, 80'. The workpiece is mounted via the clamps 62 onto a numerically controlled X-Y table 60. The kerfs 80, 80' are formed by a traveling wire 66 of an electrical discharge wire machine tool 64. This traveling wire 66 moves between a payoff reel 68 and a takeup reel 70. An X-Y guide 72 is under numerical control to deflect the wire 66 on one side of the workpiece, and a fixed guide 74 defines the position of the wire on the other side of the workpiece. These two sets of numerically controlled X-Y guides 72, 60 work in a coordinated manner to produce a kerf which is slightly wider than the wire diameter and is inclined at a constant angle with respect to the planes of the axial faces 16a, 16b, 18a, 18b of the seal ring 10, regardless of the specific configuration of the kerfs 80, 80'. Suitable machine tools are well known to those skilled in the art. Simply by way of example, the machine tool 64 may be of the type marketed by Agietron as model Agiecut DEM315.

The illustrated configuration of the kerfs 80, 80' has been chosen to utilize a geometry which minimizes kerf length and reduces stress concentrations by utilizing generous radii of curvature and avoiding acute angles which are subject to chipping and thin sections which are subject to breakage. In addition, this configuration is symmetrical about the axial center of the seal ring 10, and it therefore provides symmetrical strength characteristics. As pointed out above, the illustrated kerf configuration produces a lock in the radial direction for the full 360°. Because the points x', y of FIG. 3 are approximately diametrically opposed, the two seal ring segments 20, 40 can readily be assembled around and removed from a shaft.

Figure 4:
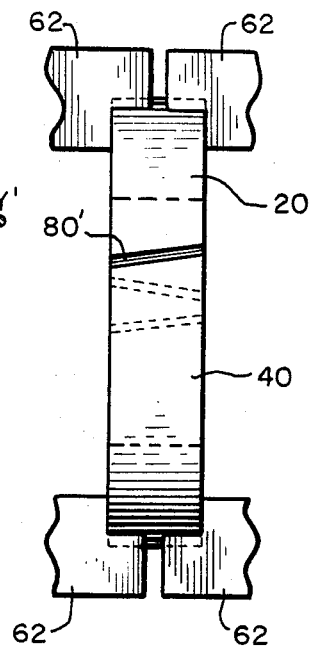
FIG. 4 is a left side view of the workpiece of FIG. 1 in the stage of fabrication of FIG. 3.

FIG. 4 shows a side view of the seal ring 10 after the kerfs 80, 80' have been machined as described above in conjunction with FIG. 3.

Figure 5:
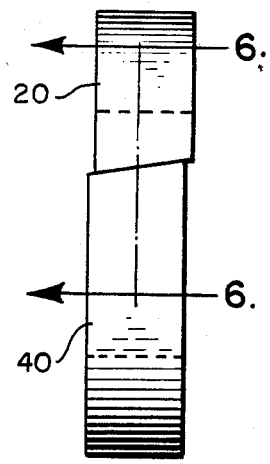
FIG. 5 is a side view corresponding to FIG. 4 showing the two ring segments moved axially to close the kerf.

After this machining operation has been completed, the kerfs 80, 80' are closed by moving one of the two segments 20, 40 axially with respect to the other until the surfaces on each side of the kerfs 80, 80' contact one another. FIG. 5 shows the manner in which such relative axial movement closes the kerfs 80, 80'.

Finally, the axial surface 16a, 16b, 18a, 18b are finished by face grinding an amount off of the higher section which is precisely the same as the axial movement required to close the kerfs 80, 80'. Depending upon the intended application it may not be necessary to face grind both the axial surfaces 16a, 16b and the axial surfaces 18a, 18b. For example, in some applications only a single seal face is required, in which case only one of the two sets of axial surfaces 16a, 16b; 18a, 18b would be finished to form a seal face. It should be clearly understood that the method described above for forming a seal ring 10 does not affect the inner or outer cylindrical surfaces 12a, 12b, 14a, 14b with respect to finish, size, or roundness. For this reason, no refinishing of these surfaces is necessary after formation of the kerfs 80 80' and face grinding of the seal faces.

The grinding and finishing operations can be performed using conventional techniques. For example, if the seal ring is formed of cemented tungsten carbide (6% cobalt binder), the two seal ring segments 20, 40 may be separated and stock may be removed with standard diamond grinding methods. Once the two segments 20, 40 have been ground to final thickness, they may be reassembled and lapped as a unit to finish the seal face or faces.

From the foregoing, it should be apparent that an improved split rotary seal ring has been described which utilizes a particularly effective geometry for providing both a radial interlock in all directions and an axial interlock in one direction in order securely to hold the two segments properly in alignment. This seal ring can readily be separated into its two component segments when it is desired to place the seal ring around a shaft or to remove it from a shaft. Furthermore, the disclosed method can be used to form the seal ring in a remarkably simple, efficient and effective manner which minimizes machining operations and completely eliminates the need for any refinishing of the cylindrical surfaces of the seal ring.

Of course, it should be understood that a wide range of changes and modifications to the preferred embodiments described above will be apparent to those skilled in the art. For example, the shapes of the ends of the segments can be modified as necessary to fit individual applications. Furthermore, materials and machining techniques can be modified as necessary. It is therefore intended that the foregoing detailed description be regarded as illustrative rather than limiting, and that it be understood that it is the following claims, including all equivalents, which are intended to define the scope of this invention.

I claim:

1. A split seal ring comprising:
   a first ring segment which defines a first axial face and first and second ends; and
   a second ring segment which defines a second axial face and third and fourth ends;
   said first and second ends shaped to mate and interlock with the third and fourth ends, respectively, to hold the first and second ring segments in radial alignment;
   each of said first and second said ends defined by a respective folded first plane inclined at a first angle, greater than 90°, with respect to the first axial face;
   each of said folded first planes defined by a respective array of rectilinear first lines, each of which extends completely through the first ring segment, intersects the first axial face, and is inclined at said first angle with respect to the first axial face;
   each of said third and fourth ends defined by a respective folded second plane inclined at a second angle, equal to the supplement of the first angle, with respect to the second axial face;
   each of said folded second planes defined by a respective array of rectilinear second lines, each of which extends completely through the second ring segment, intersects the second axial face, and is inclined at said second angle with respect to the second axial face;
   said ends shaped to define mating wedges which allow axial movement between the first and second ring segments in a first axial direction while preventing axial movement between the first and second ring segments in a second axial direction, opposed to the first axial direction.

2. The invention of claim 1 wherein said ends maintain said first and second axial faces in coplanar axial alignment in the selected axial direction.

3. The invention of claim 1 wherein the first angle is substantially equal to 97°.

4. The invention of claim 1 wherein each of the first and second ring segments defines an inner cylindrical surface which extends over an arc of about 180° between the respective ends.

5. The invention of claim 1 wherein the first end defines a first trough which converges away from the first axial face; wherein the second end defines a second trough which converges away from the first axial face; wherein the first end defines a first ridge which diverges away from the first axial face; wherein the second end defines a second ridge which diverges away from the first axial face; wherein the third end defines a third trough and a third ridge shaped to mate with the first ridge and first trough, respectively; and wherein the fourth end defines a fourth trough and a fourth ridge shaped to mate with the second trough and second ridge, respectively.

6. The invention of claim 1 wherein each folded plane intersects the respective axial face in an S curve.

7. The invention of claim 1 wherein the first and second ends interlock to immobilize the seal ring segments against relative movement in any radial direction.

8. The invention of claim 1 wherein a first portion of the rectilinear first lines is oriented nonparallel to a second portion of the rectilinear first lines, and wherein a first portion of the rectilinear second lines is oriented nonparallel to a second portion of the rectilinear second lines.

9. The invention of claim 1 wherein the first, second, third and fourth ends are shaped such that a constant thickness gap extending between adjacent ends at a constant predetermined angle with respect to the first axial face is created when the first and second ring segments are separated axially, and wherein said gap increases in thickness with increasing axial separation between the first and second seal ring segments.

10. A split seal ring comprising:
    first and second seal ring segments, each of which defines respective first and second ends;
    said first ends shaped to interlock with one another and said second ends shaped to interlock with one another such that the seal ring segments are immobilized against relative movement in any radial direction when the ends of the seal ring segments are interlocked to form an assembled seal ring;
    said assembled seal ring defining first and second axial faces;
    said first and second ends of said first seal ring segment defining respective first slant faces extending completely across the first seal ring segment between the first and second axial faces and inclined toward the first axial face;

each of said first slant faces defined by a respective array of rectilinear first lines, each of which extends completely through the first seal ring segment between the first and second axial faces;

said first and second ends of said second seal ring segment defining respective second slant faces extending completely across the second seal ring segment between the first and second axial faces, inclined toward the second axial face, and shaped to mate with respective ones of the slant faces defined by the ends of the first seal ring segment;

each of said second slant faces defined by a respective array of rectilinear second lines, each of which extends completely through the second seal ring segment between the first and second axial faces.

11. The invention of claim 10 wherein each of said slant faces is inclined at a constant, predetermined angle with respect to the axial faces.

12. The invention of claim 10 wherein the radially inner portions of the slant surfaces are diametrically opposed.

13. The invention of claim 10 wherein each of the slant faces intersects the axial faces in a meander pattern.

14. The invention of claim 13 where each of the slant faces intersects the axial faces in an S curve.

15. The invention of claim 10 wherein the first and second slant faces are shaped such that a constant thickness gap extending between the first and second axial faces at a constant, predetermined angle with respect to the axial faces is created when the first and second seal ring segments are separated axially, and wherein said gap increases in thickness with increasing axial separation between the first and second seal ring segments.

16. The invention of claim 10 wherein a first portion of the rectilinear first lines is oriented nonparallel to a second portion of the rectilinear first lines; wherein a first portion of the rectilinear second lines is oriented nonparallel to a second portion of the rectilinear second lines; wherein each of the rectilinear first lines is inclined at a first selected angle to the first axial face; wherein each of the rectilinear second lines is inclined at a second selected angle to the first axial face; and wherein the sum of the first and second selected angles is 180°.

17. The invention of claim 10 wherein the first end of the first seal ring segment defines a first trough which converges away from the first axial face and a first ridge which diverges away from the first axial face; wherein the second end of the first seal ring segment defines a second trough which converges away from the first axial face and a second ridge which diverges away from the first axial face; wherein the first end of the second seal ring segment defines a third trough and a third ridge shaped to mate with the first ridge and the first trough, respectively; and wherein the second end of the second seal ring segment defines a fourth trough and a fourth ridge shaped to mate with the second ridge and the second trough, respectively.

18. A method of forming a split seal ring comprising the following steps:

providing an integral seal ring workpiece having at least one surface of revolution centered on an axis;

cutting the workpiece to form a kerf at two regions in the workpiece to create two separate ring segments, said kerf oriented at a substantially constant, non-zero angle with respect to a plane transverse to the axis and shaped such that the two ring segments are radially interlocked and axially interlocked in one direction only;

moving one of the ring segments axially with respect to the other to close the kerf; and then finishing at least one axial seal surface on the first and second ring segments.

19. The method of claim 18 wherein the kerf formed in the cutting step intersects the inner surface at diametrically opposed regions.

20. The method of claim 18 wherein the non-zero angle is about 97°.

21. The method of claim 18 wherein the kerf is shaped in a meander pattern.

22. The method of claim 21 wherein the meander pattern is an S curve.

23. The method of claim 18 wherein the at least one surface of revolution comprises a cylindrical surface.

24. The method of claim 18 wherein the at least one surface of revolution comprises two concentric cylindrical surfaces.

* * * * *